Patented June 8, 1926.

1,588,381

UNITED STATES PATENT OFFICE.

LUDWIG BENDA, OF MAINKUR, NEAR FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

HYDROXY BENZOYLAMINO-BENZENEARSONIC ACIDS AND PROCESS FOR MAKING THE SAME.

No Drawing. Application filed June 2, 1924, Serial No. 717,438, and in Germany June 14, 1923.

I have found that while o-aminophenol if acted on by benzoylchloride according to Schotten-Baumann forms aminophenolbenzoate and benzamidophenolbenzoate

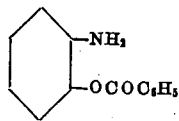 and 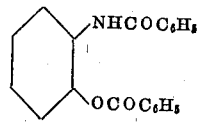

the arsonic acids of the orthoaminophenols in a smooth reaction surprisingly yield the monobenzoyl-amino compounds exclusively.

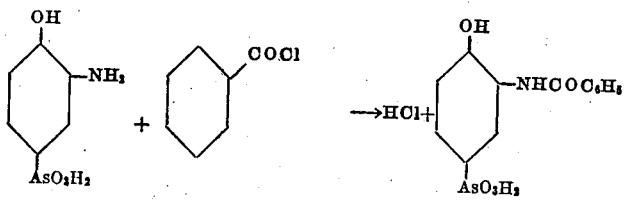

These new substances, in addition to a relative non-toxicity, possess valuable therapeutic and prophylactic properties in respect to trypanosomes and diseases caused by spirochaetæ; they may be administered per os and parenterally.

Example.

4.7 kilos 4-amino-3-hydroxybenzene-1-arsonic acid [Benda, B. B. 44 3578 (1911)] are dissolved in 40 litres normal caustic soda solution and 2 litres caustic soda solution ten times normal; the solution with the addition of 3 kilos benzoylchloride is heated for a short while on the water bath while shaking well.

After adding 35 litres normal hydrochloric acid the solution is cooled down, the new compound precipitates, and after filtering is washed with water. It may be recrystallized from a normal sodium acetate solution. Analysis yielded the following result:

C: calculated 46.29%, H: calculated 3.56%, as calculated 22.25%.

C: found 46.52%, H: found 3.78%, as found 21.95%.

The substance is not diazotizable. It is sparingly soluble in water, alcohol and hydrochloric acid, insoluble in ether, but dissolves easily in alkalies.

If in the above example the 4-amino-3-hydroxybenzene-1-arsonic acid is substituted by the 3-amino-4-hydroxybenzene-1-arsonic acid, as borne out by analysis, an isomeric compound is formed with the above which is likewise benzoylated in the nitrogen only. Both isomerics show a very great similarity in chemical physical and biological respect.

Having now particularly described and ascertained the nature of my said invention and in what manner the same is to be performed, I declare, that what I claim is:

1. Process for the production of N-benzoyl-aminophenolarsonic acids, by treating arsonic acids of an orthoaminophenol with a benzoylchloride.

2. Process for the production of 3-benzoyl-amino-4-hydroxybenzene-1-arsonic acid, by treating 3-amino-4-hydroxybenzene-1-arsonic acid with benzoylchloride.

3. As new products the compounds formed by treating arsonic acids of an ortho-aminophenol with a benzoylchloride, forming colorless, crystalline substances, sparingly soluble in water and alcohol, but easily soluble in alkalies and, in contrast to the parent materials, not being diazotizable.

4. As a new product, the compound formed by treating 3-amino-4-hydroxybenzene-1-arsonic acid with benzoyl chloride, forming a colorless crystalline substance and dissolving but very sparingly in water or alcohol, easily if heated in normal caustic soda solution in sodium carbonate even cold and being not diazotizable.

In witness whereof I have hereunto signed my name this 16th day of May, 1924.

LUDWIG BENDA.

Certificate of Correction.

It is hereby certified that in Letters Patent No. 1,588,381, granted June 8, 1926, upon the application of Ludwig Benda, of Mainkur, near Franfort-on-the-Main, Germany, for an improvement in "Hydroxy Benzoylamino-Benzenearsonic Acids and Processes for Making the Same," an error appears in the printed specification requiring correction as follows: Page 1, lines 32 and 33, for the chemical word " as " read *As:;* and that the said Letters Patent should be read with this correction therein that the same may conform to the record of the case in the Patent Office.

Signed and sealed this 24th day of August, A. D. 1926.

[SEAL.]
M. J. MOORE,
*Acting Commissioner of Patents.*